(12) United States Patent
Su

(10) Patent No.: US 7,725,141 B2
(45) Date of Patent: May 25, 2010

(54) MULTI-FUNCTIONAL DETACHED MOBILE PHONE

(76) Inventor: Wang Su, 154 Donegan Ave., East Patchogue, NY (US) 11772

( * ) Notice: Subject to any disclaimer, the term of this patent is extended or adjusted under 35 U.S.C. 154(b) by 778 days.

(21) Appl. No.: 11/650,652

(22) Filed: Jan. 8, 2007

(65) Prior Publication Data

US 2008/0167080 A1     Jul. 10, 2008

(51) Int. Cl.
*H04M 1/00* (2006.01)
*H04B 1/38* (2006.01)

(52) U.S. Cl. ............. 455/575.1; 455/575.2; 455/575.3; 455/566

(58) Field of Classification Search ............. 455/575.1, 455/575.2, 575.3, 566
See application file for complete search history.

(56) References Cited

U.S. PATENT DOCUMENTS

| 6,708,046 | B1* | 3/2004 | Takagi | 455/575.3 |
| 2002/0102946 | A1* | 8/2002 | SanGiovanni | 455/90 |
| 2004/0198472 | A1* | 10/2004 | Kotzin | 455/575.1 |
| 2004/0259587 | A1* | 12/2004 | Chadha | 455/550.1 |
| 2006/0029018 | A1* | 2/2006 | Mizukami et al. | 370/328 |
| 2009/0069062 | A1* | 3/2009 | Suzuki et al. | 455/575.7 |
| 2009/0149231 | A1* | 6/2009 | Sato | 455/575.7 |

* cited by examiner

*Primary Examiner*—Matthew D Anderson
*Assistant Examiner*—Bobbak Safaipour

(57) ABSTRACT

An improved portable mobile phone is disclosed wherein the mobile phone comprises two modules and the mobile phone can function properly when the two modules are physically connected as well as when the two modules are detached, and wherein the mobile phone has two modes of operation, one of which is the communication mode of operation and another one of which is the entertainment mode of operation.

20 Claims, 4 Drawing Sheets

MULTI-FUNCTIONAL DETACHED MOBILE PHONE

FIELD OF INVENTION

The present invention is generally related to consumer mobile phones.

BACKGROUND OF THE INVENTION

Presently, consumer mobile phones have displays, key pads, microprocessors all built into one connected unit. Sometimes there are two modules of this one connected unit. One module comprises a display, anther module comprises a keypad, a microprocessor, and a battery. These two modules are hinged together so that they can be closed and opened in a clam shell configuration, or the display module can slide up and down relative to the keypad module to expose or conceal the keypad.

These current configurations of the mobile phones need the two modules to be physically connected together to function properly. The two modules can not be taken apart, otherwise the mobile phone is broken and can not perform its normal functions properly such as taking and receiving phone calls.

Certain functions can be better achieved when one module is taken apart from another module. Therefore, there is a need for an improved mobile phone that can be taken apart and still functions properly as a mobile phone, and one module of the mobile phone is used to remotely control another module of the mobile phone when they are detached from each other. There is also a need for an improved mobile phone that can be used more flexibly.

DETAILED DESCRIPTION OF POSSIBLE EMBODIMENTS OF THE INVENTION

Possible embodiments of the invention are discussed in this section.

Figure 1:
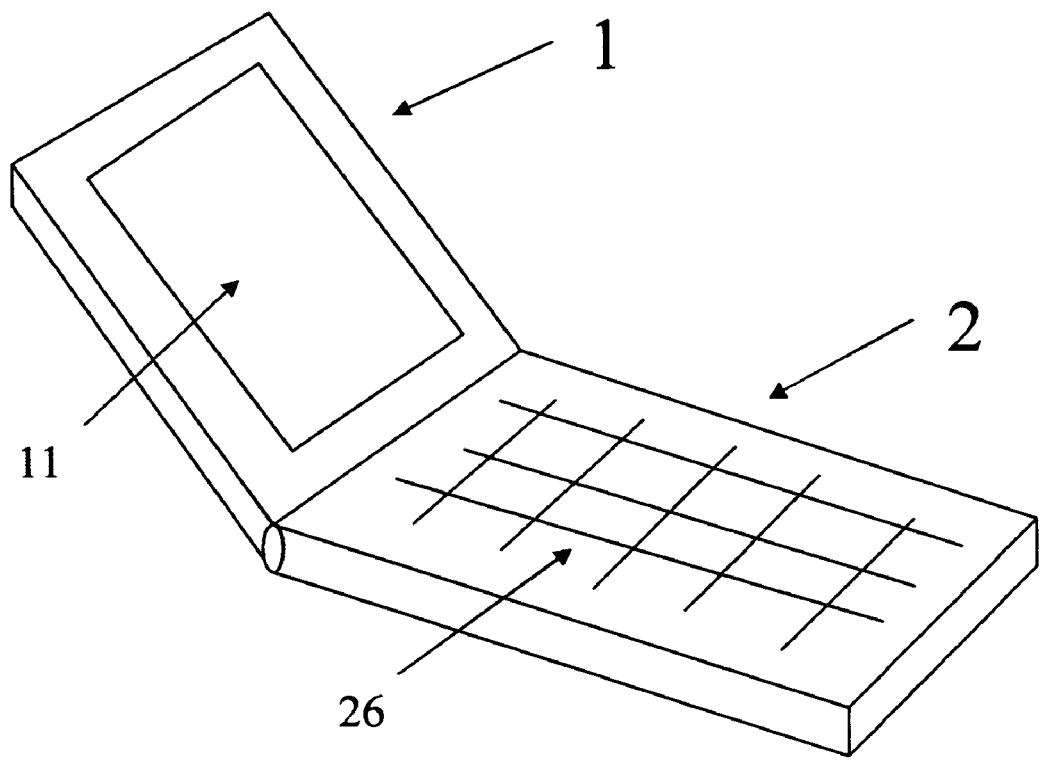
FIG. 1 shows one embodiment of the invention when two modules of a mobile phone are physically connected.
Figure 2:
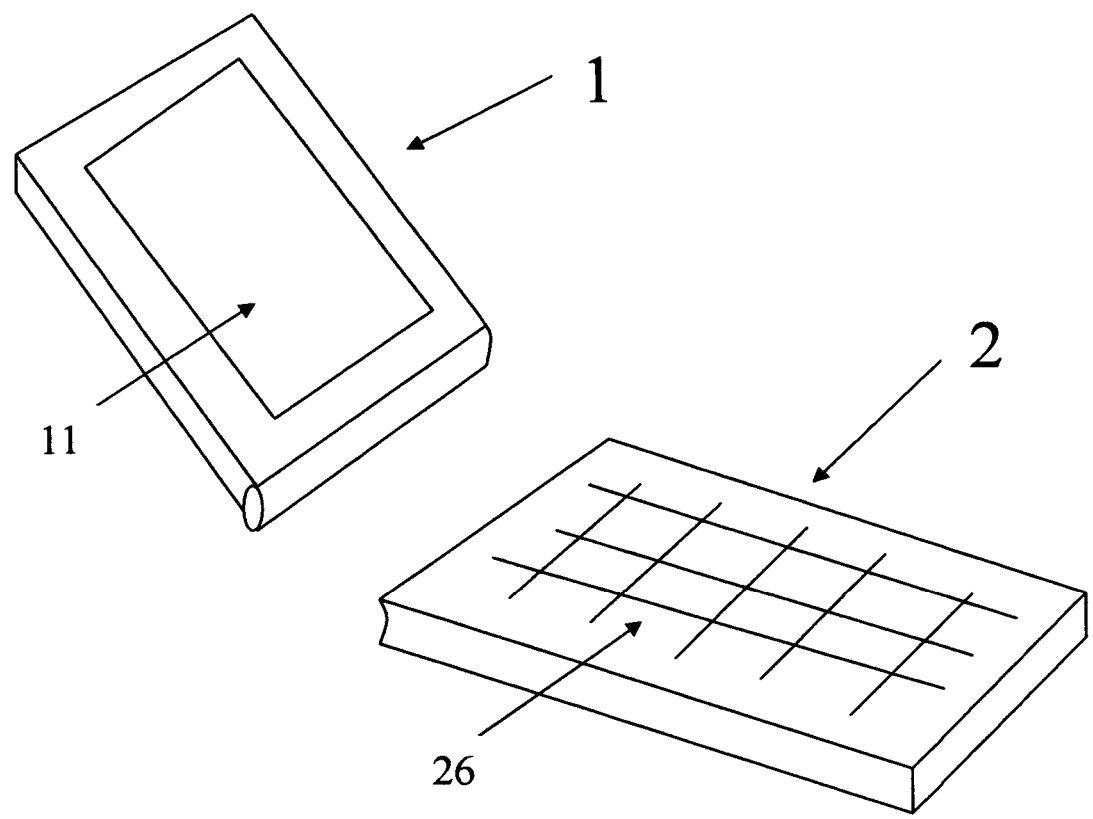
FIG. 2 shows one embodiment of the invention when two modules of a mobile phone are detached.

According to one embodiment of the invention, a mobile device, such as a mobile phone is presented. Such mobile device comprises two modules, Module 1 and Module 2. The mobile device can function properly when the two modules are physically connected, such as shown in FIG. 1, or physically separated, such as shown in FIG. 2. The embodiments shown in FIG. 1 and FIG. 2 have the two modules connected in a hinged fashion when they are physically connected. Many other connection fashions are possible. For example according to another embodiment of the invention, the two modules are connected through a sliding slot, so that one module can slide back and forth in relation to the other module, when they are physically connected together.

Figure 3:
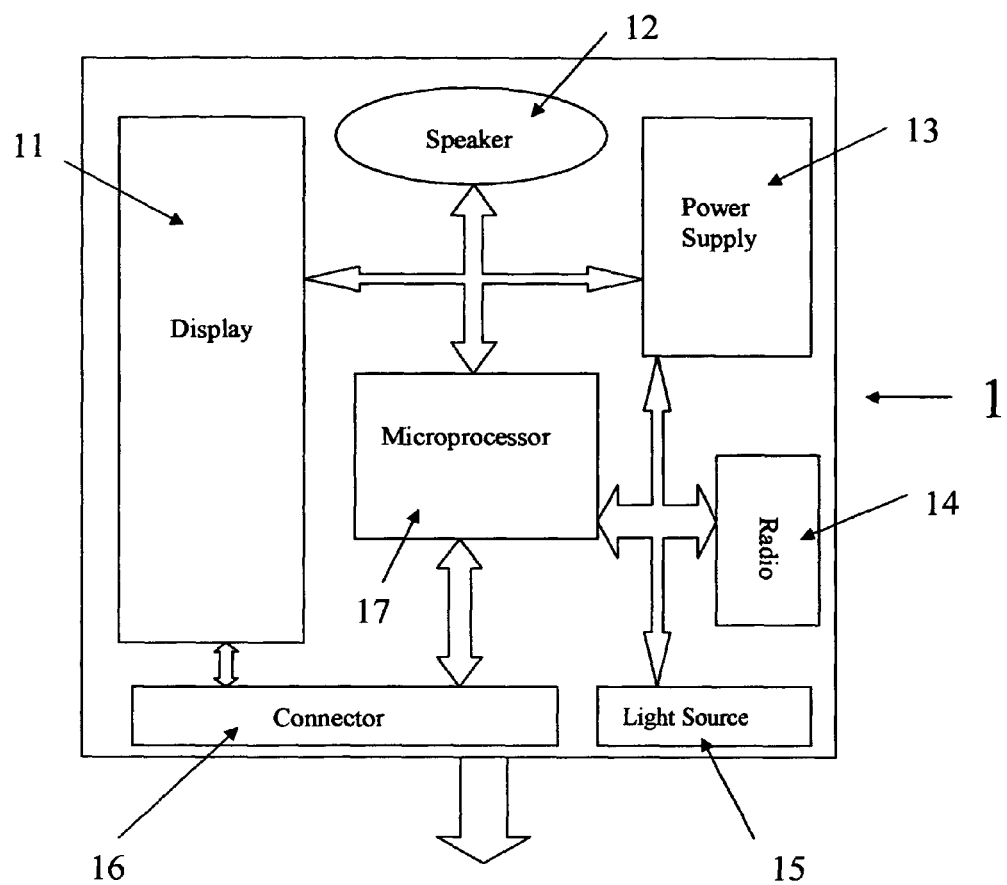
FIG. 3 is a schematic diagram showing an illustrative system of one of the two modules of a mobile phone according to one embodiment of the invention.

FIG. 3 shows a schematic diagram of Module 1 according to one embodiment of the invention. Module 1 has a Display 11 that covers a large area of one of Module 1's surfaces. Module 1 also comprises a Microprocessor 17, a Power Supply 13, and a wireless Radio 14. It may further comprise a Speaker 12, a Connector 16, and a Light Source 15. Microprocessor 17 controls the functions of the various components through electric connections. Power Supply 13 supplies electrical power to the various components. The Light Source 15 may emit visible light, or light invisible to human, such as infrared light. The Speaker 12 can be a single speaker, it can also be a group of speakers working together such as a pair of stereo speakers. The wireless Radio 14 is preferably a wireless transceiver that is capable of communicating with another wireless transceiver through a wireless communication link Connector 16 is used to physically connect Module 1 with Module 2. It can be just a mechanical connector, such as a hook, a hinge, a sliding slot, a magnet, a suction cup, or any of their structural or functional equivalents. Preferably, Connector 16 is also an electrical connector as well as a mechanical connector, which is capable of forming an electrical connection in addition to a mechanical connection between Module 1 and Module 2. The various components of Module 1 may be placed in one common housing.

Figure 4:
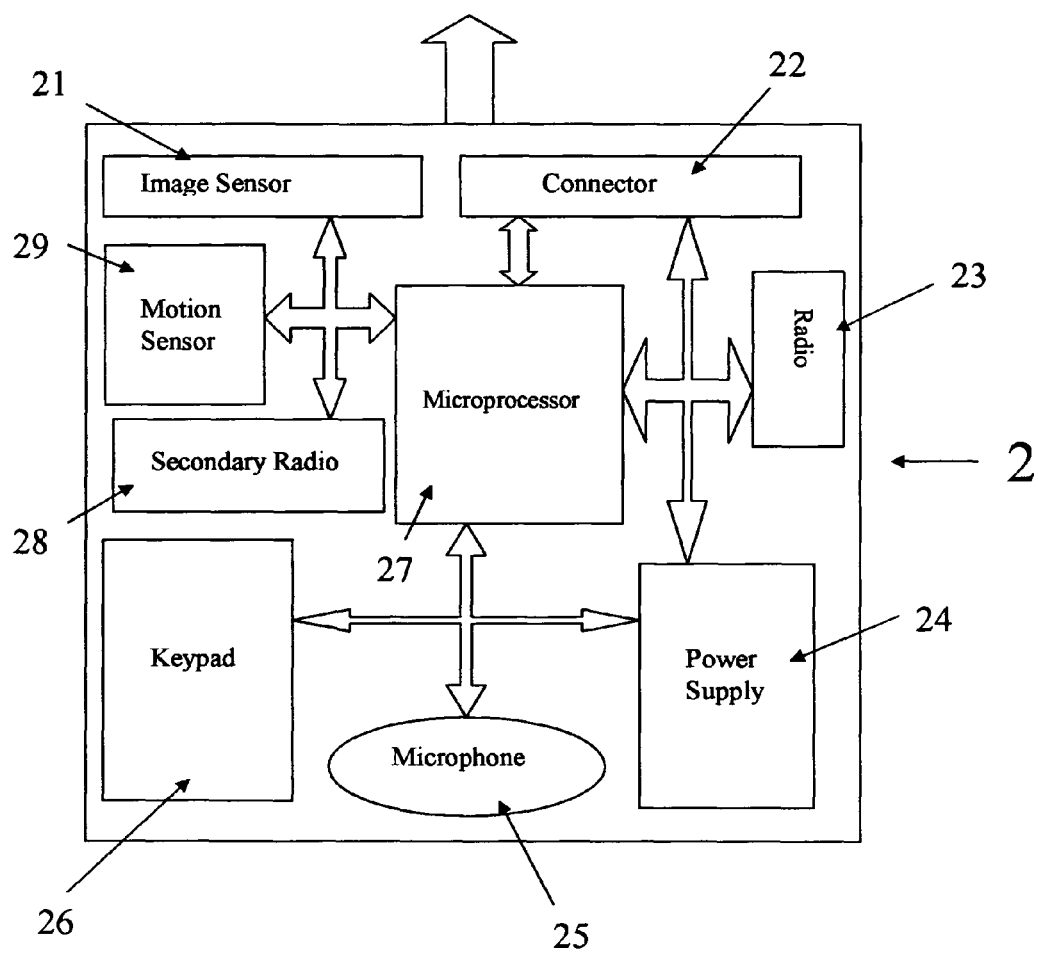
FIG. 4 is a schematic diagram showing an illustrative system of the other one of the two modules of a mobile phone according to one embodiment of the invention.

FIG. 4 shows a schematic diagram of Module 2 according to one embodiment of the invention. Module 2 comprises a Keypad 26, a Microprocessor 27, a Motion Sensor 29, a wireless Radio 23, and a Power Supply 24. It may also comprise an Image Sensor 21, a Connector 22, a Secondary Radio 28, and a Microphone 25. Microprocessor 27 controls the various components through electrical connections. Radio 23 is preferably a wireless transceiver and is adapted to communicate with Radio 14 of Module 1 through a wireless link. The Secondary Radio 28 is preferably a wireless transceiver that is adapted to wirelessly communicate with a remote device that is located remotely from the current device. The Keypad 26 is for receiving user inputs, such as a dialing number to be used by the current device to communicate with a remote device. Keypad 26 can be a physical keypad with multiple mechanical keys. It can also be a virtual keypad displayed on a touch sensitive screen. Keypad 26 usually occupies a large area of one of Module 2's surfaces. Power Supply 24 supplies power to the various components through electronic connections. Connector 22 is used to physically connect Module 1 with Module 2 through Connector 16. It may have similar characteristics as Connector 16. If either Connector 16 or Connector 22 is capable of forming a connection without a corresponding connector, such as a suction cup, then only one connector is needed. Motion Sensor 29 is adapted to detect a movement of Module 2. It is preferably a 3-axis acceleration sensor that detects movements in a three dimensional space. Image Sensor 21 is adapted to detect light emitted from Module 1 so as to provide additional information regarding the relative positions between Module 1 and module 2. This additional information can be used in conjunction with the information produced by Motion Sensor 29 to calculate the movement of Module 2 relative to Module 1. Light can be emitted from Display 11 of Module 1, or preferably from a dedicated Light Source 15 of Module 1. Light Source 15 can be light sources that emit visible light, or light sources that emit light invisible to human but detectable by Image Sensor 21, such as infrared light-emitting diodes ("LEDs"). The various components of Module 2 may be placed in one common housing.

According to one embodiment of the invention, Module 1 and Module 2 can be physically connected through Connector 16 and Connector 22, they can also be detached and still remain properly functional. When Module 1 and Module 2 are physically connected, if Connector 16 and Connector 22 are simply mechanical connectors without electrical connection, then Module 1 and Module 2 would operate in a similar manner as they are detached in a detached state, which will be described in the latter parts of the specification. On the other hand, if Connector 16 and Connector 22 are both mechanical and electrical connectors, after the detection of an electrical connection between Module 1 and Module 2, Microprocessor 17 or Microprocessor 27 redistributes powers from Power Supply 13 and Power Supply 24 so that one of the two power supplies becomes the main power supply, and the other one is only used to provide limited power supply. According to another embodiment of the invention, one of the two power supplies can be turned off and the entire device is supported by the remaining power supply through the electrical connection between the two modules. It is well known in the art how to regulate power supplies with microprocessors, therefore it will not be described in detail here. In addition, upon the detection of electrical connection through Connector 16 and Connector 22, Microprocessor 17 or Microprocessor 27 can switch off the wireless communication link between Radio 14 and Radio 23, and turn on a wired communication link between these two modules through the electrical connection between Connector 16 and Connector 22. In this way, the two modules can exchange data signals through a wired connection instead of a wireless connection, so as to save power and increase reliability. A person with ordinary skill in the art would understand how to detect the presence of an electrical connection, and, upon such detection, switch on and off certain data communication links.

According to one embodiment of the invention, there are two modes of operation with this novel device. One mode of operation is the communication mode, another mode of operation is the entertainment mode. Preferably, the communication mode of operation is performed when Module 1 and Module 2 are mechanically and electrically connected through Connector 16 and Connector 22, and the entertainment mode of operation is performed when Module 1 and Module 2 are physically detached from each other.

When the current device is in the communication mode of operation, the primary function of the current device is to establish a wireless communication link with a remote device located away from the current device. Preferably, this is achieved by using the Secondary Radio 28. FIG. 4 shows that Secondary Radio 28 is placed in Module 2, but it can also be placed in Module 1. The word "secondary" does not suggest that Secondary Radio 28 is less important than Radio 14 or Radio 23, it simply means that Secondary Radio 28 is a separate radio and preferably uses a different wireless communication protocol. Preferably, Radio 14 and Radio 23 are short range radios designed to communicate through a short range wireless communication protocol, such as the Bluetooth protocol, and Secondary Radio 28 is a long range radio designed to communicate through long range wireless communication protocols, such as cellular communication protocols used in cellular phones. Both Bluetooth protocol and cellular communication protocols are well known in the relevant art, therefore they will not be described in detail here. Wireless radios commonly comprise wireless transmitters and wireless receivers. Wireless transmitters and wireless receivers can be built into one unit called a wireless transceiver, they can also be placed separately in a wireless device.

According to one embodiment of the present invention, when the current device is in the communication mode of operation, Module 1 and Module 2 are physically connected to each other through Connector 16 and Connector 22. Connector 16 and Connector 22 establish both mechanical and electrical connections between Module 1 and Module 2. Radio 14 and Radio 23 are short range radios designed to communicate with each other, and Secondary Radio 28 is a long range radio designed to communicate with a remote unit. In this situation, the wireless communication link between Radio 14 and Radio 23 is preferably turned off. Instead, data communication between Module 1 and Module 2 is conducted through the electrical connection via Connector 16 and Connector 22. Users use the Keypad 26 located on Module 2 to dial in a certain number. At least one of the Microprocessor 17 and Microprocessor 27 receives the dialed in number and sends out a communication signal through the Secondary Radio 28 using a cellular communication protocol. The number can also be displayed on Display 11 located on Module 1 as a feedback to the user. Once a wireless communication link with a remote unit corresponding to the dialed in number is established, voice signals can be received from Microphone 25 and converted into digital signals through an analog to digital converter. At least one of the Microprocessor 17 and Microprocessor 27 directs the digital signal to be transmitted through Secondary Radio 28 using a cellular communication protocol to the remote unit. Secondary Radio 28 then receives digital signals back from the remote unit. The received digital signals are passed onto a digital to analog converter. The converted analog signals are then played back to the user through Speaker 12. Motion Sensor 29 and Light Source 15 are mostly provided for entertainment purposes therefore they are preferably turned off during the communication mode of operation. Limited entertainment functions may still be provided during the communication mode of operation. For example, user may play a video game stored in a memory, not shown in the figures, using Keypad 26 and Display 11.

Alternatively, Secondary Radio 28 can be a WiFi radio that communicates with a remote unit through the IEEE 802.11 protocol. IEEE 802.11 communication protocol is well known in the relevant art. In a further possible embodiment, Secondary Radio 28 is omitted, and Radio 14 and Radio 23 are both WiFi radios so that the can be used to establish communication links between each other as well as to establish communication links with remote units.

According to one embodiment of the invention, in the entertainment mode of operation, Module 1 and Module 2 are detached from each other in a detached state. In this mode of operation, Radio 14 and Radio 23 are preferably turned on to establish a wireless communication link between Module 1 and Module 2. Additionally, Motion Sensor 29 and Light Source 15 are preferably turned on to perform certain entertainment functions. Motion Sensor 29 is preferably a 3-axis acceleration sensor that detects movements in a three dimensional space. When users hold Module 2 in their hands and move in the space, Motion Sensor 29 detects such movement and produces electronic signals indicating such movements. Image Sensor 21 senses light from a light source on Module 1. The light source can be Display 11, or preferably a dedicated Light Source 15. Light signals sensed by the Image Sensor 21 from Light Source 15 is used in combination with the electronic signals produced by Motion Sensor 29 to calculate more accurately the movement of Module 2 in relation to Module 1. Using motion sensor and image sensor to generate more accurate movement information is well know in the art. For example, such technology is being used in Nintendo Wii's remote control. Once the movement information on Module 2 is generated, at least two options are available according to the present invention. According to one embodiment of the invention, Microprocessor 27 processes the movement information to generate certain commands according to a software program stored in a memory not shown in the figures. The commands are sent out through Radio 23 and received by Microprocessor 17 through Radio 14. Microprocessor 17 then controls certain functions based on the command, such as changing certain images on Display 11. According to another embodiment of the invention, Microprocessor 17 processes the movement information to generate certain control commands to control certain functions of Module 1, such as producing a sound through Speaker 12.

During the entertainment mode of operation, it is preferred that the communication function of the present device is still maintained at least to a certain extent. For example, if Secondary Radio 28 receives a wireless signal from a remote unit, it passes it onto Microprocessor 27. Microprocessor 27 may decide to send a signal back to the remote unit notifying it that the current device is busy and asks it to hold. Microprocessor 27 may also turn on a visual or an audio signal on the current device to inform the user that a call has come in. The user can then decide to turn off the running application and pick up the call. A secondary speaker may be built onto Module 2 and activated during the entertainment mode of operation so that Module 2 may act as a mini cell phone during the entertainment mode of operation. Alternatively, the user may also use Speaker 12 on Module 1 during the entertainment mode of operation through a wireless link between Radio 14 and Radio 23. According to another embodiment of the invention, Secondary Radio 28 is located in Module 1. Once Secondary Radio 28 receives a communication signal from a remote unit, it passes it onto Microprocessor 17. Microprocessor 17 may react to the signal in a similar manner as described above for Microprocessor 27, it may also pass it onto to Microprocessor 27 through a wireless communication link between Radio 14 and Radio 23. If the wireless signals received by Secondary Radio 28 are image signals, they can be displayed on Display 11. If the wireless signals received by Secondary Radio 28 are audio signals, they can be reproduced through Speaker 12. According to yet another embodiment of the present invention, Secondary Radio 28 is omitted, and Radio 14 and Radio 23 are both WiFi radios. At least one of Radio 14 and Radio 23 is used to establish a wireless communication link with a remote unit using the IEEE 802.11 communication protocol and to perform similar functions as Secondary Radio 28.

It is obvious that there are numerous different variations and combinations of the above described embodiments of the invention. All these different variations, combinations and their structural or functional equivalences are considered as part of the invention. The terms used in the specification are illustrative and are not meant to restrict the scope of the invention. The described methods have steps that can be performed in different orders and yet achieve the same results. All the variations in the orders of the method steps are considered as part of this invention as long as they achieve substantially the same results.

The invention is further defined and claimed by the following claims.

I claim:

1. A mobile device comprising:
   a first module having a display, a first power supply, a first microprocessor, a first radio;
   a second module having a keypad, a second microprocessor, a second radio, a motion sensor, a second power supply; and
   a first connector belonging to one of the first module and the second module;
   wherein the first module and the second module are portable and can be physically attached to each other through the first connector and the mobile device is capable of functioning properly as one working set of units both when the first module and the second module are physically connected and when the two modules are physically detached, and wherein the mobile device is capable of communicating with a remote unit through a first wireless communication link, and wherein the first radio and the second radio are capable of communicating with each other through a second wireless communication link, and wherein the motion sensor is capable of producing an information for the calculation of a movement of the second module.

2. The mobile device of claim 1 wherein the first connector is capable of forming both a mechanical connection and an electrical connection.

3. The mobile device of claim 1 further comprising a second connector wherein the second connector is capable of connecting to the first connector.

4. The mobile device of claim 1 further comprising a third radio.

5. The mobile device of claim 4 wherein the third radio is capable of communicating with a remote device using a first wireless communication protocol, the first radio and the second radio are capable of communicating with each other using a second wireless communication protocol, and the first wireless communication protocol is different from the second wireless communication protocol.

6. The mobile device of claim 5 wherein the first wireless communication protocol is a cellular communication protocol.

7. The mobile device of claim 5 wherein the first wireless communication protocol is IEEE 802.11 communication protocol.

8. The mobile device of claim 5 wherein the second wireless communication protocol is the Bluetooth protocol.

9. The mobile device of claim 1 further comprising an image sensor and a light source, wherein the image sensor and the light source are placed in different housings and wherein the image sensor is capable of producing an additional information for the calculation of a relative movement between the first module and the second module.

10. The mobile device of claim 9 wherein the light source comprises infrared light-emitting diodes.

11. The mobile device of claim 1 further comprising a microphone and a speaker.

12. The mobile device of claim 1 wherein at least one of the first microprocessor and the second microprocessor is adapted to redistribute powers from the first power supply and the second power supply after an electrical connection is detected between the first module and the second module.

13. A method for operating an improved mobile device comprising the steps of:
   receiving phone calls with the improved mobile device;
   sending out wireless signals with the improved mobile device through a first wireless communication link;
   physically detaching a first module having a display and a second module having a keypad, wherein the improved mobile device is capable of functioning properly as one working set of units both when the first module and the second module are physically connected and when the two modules are physically detached turning on a second wireless communication link between the first module and the second module;
   displaying images on the display of the first module;
   receiving dialing numbers from the keypad of the second module for wireless communication with a remote device;
   sensing a motion of the second module with a motion sensor and producing an information for the calculation of a movement of the second module and producing a result on the first module in reaction to the motion of the second module; and generating a feedback when a phone call is received.

14. The method of claim 13 wherein the first wireless communication link uses a first wireless communication protocol and the second wireless communication links uses a second wireless communication protocol, and the first wireless communication protocol is different from the second wireless communication protocol.

15. The method of claim 13 further comprising the step of sensing a light from the first module and producing an additional information for the calculation of a relative movement between the first module and the second module.

16. The method of claim 13 wherein the result on the first module in reaction to the motion of the second module is changing an image on the display of the first module.

17. The method of claim 13 further comprising the steps of detecting a connection between the first module and the second module and turning off the second wireless communication link after the connection is detected.

18. The method of claim 13 further comprising the steps of detecting a connection between the first module and the second module and redistributing powers supplied from a first power supply and a second power supply after the connection is detected.

19. A mobile device comprising:
a first module having a display, a first power supply, a first microprocessor, a first radio means for conducting wireless communications;
a second module having a keypad means for receiving inputs, a second microprocessor, a second radio means for conducting wireless communications, a motion sensor means for detecting motions, a second power supply; and
a first connector means belonging to one of the first module and the second module for forming a connection;
wherein the first module and the second module are portable and can be physically attached to each other through the first connector means and the mobile device is capable of functioning properly as one working set of units both when the first module and the second module are physically connected and when the two modules are physically detached and wherein the mobile device is capable of communicating with a remote unit through a first wireless communication link, and wherein the first radio means and the second radio means are capable of communicating with each other through a second wireless communication link, and wherein the motion sensor means is capable of producing an information for the calculation of a movement of the second module.

20. The mobile device of claim 19 further comprising a third radio means for conducting wireless communications.

* * * * *